United States Patent [19]

Sugawara

[11] 4,225,100
[45] Sep. 30, 1980

[54] TAPE CASSETTE

[75] Inventor: Kokichi Sugawara, Tagajo, Japan

[73] Assignee: Sony Corporation, Tokyo, Japan

[21] Appl. No.: 22,304

[22] Filed: Mar. 20, 1979

[30] Foreign Application Priority Data

Mar. 23, 1978 [JP] Japan .................. 53-36147[U]
Dec. 29, 1978 [JP] Japan .................. 53-181914[U]

[51] Int. Cl.³ ............................................. G11B 23/10
[52] U.S. Cl. ............................... 242/198; 29/806
[58] Field of Search ............... 242/198, 71.2, 54.1,
242/55.19 A, 199, 200, 197; 360/132; 352/72,
78 R; 29/806

[56] References Cited

U.S. PATENT DOCUMENTS

| 2,206,032 | 7/1940 | Foster | 242/71.2 X |
| 2,391,497 | 12/1945 | Wilson et al. | 242/71.2 X |
| 2,424,498 | 7/1947 | Nygaard | 242/54.1 X |
| 2,687,259 | 8/1954 | Owens | 242/198 X |
| 3,066,880 | 12/1962 | Bauer | 242/198 |
| 3,900,172 | 8/1975 | Kamaya | 242/198 |

FOREIGN PATENT DOCUMENTS

| 946106 | 12/1948 | France | 242/198 |
| 250415 | 4/1926 | United Kingdom | 242/71.2 |
| 1444912 | 8/1976 | United Kingdom | 242/198 |

Primary Examiner—George F. Mautz
Attorney, Agent, or Firm—Lewis H. Eslinger; Alvin Sinderbrand

[57] ABSTRACT

A tape cassette for a magnetic recording and/or reproducing apparatus, such as a video tape recorder. The cassette has at least one reel contained in a cassette casing formed with an opening through which a magnetic tape wound on the reel can be withdrawn from the casing for the recording of signals thereon or the reproducing of signals therefrom. A pivotally mounted member disposed within the casing comprises a brake lever for preventing the reel from rotating when the cassette is not in use. A helical compression spring normally urges the pivotally mounted member to rotate so as to bring the brake lever into engagement with teeth formed on a flange of the reel, and means is provided to overcome the action of the spring and release the brake lever from the reel when the cassette is to be used.

15 Claims, 15 Drawing Figures

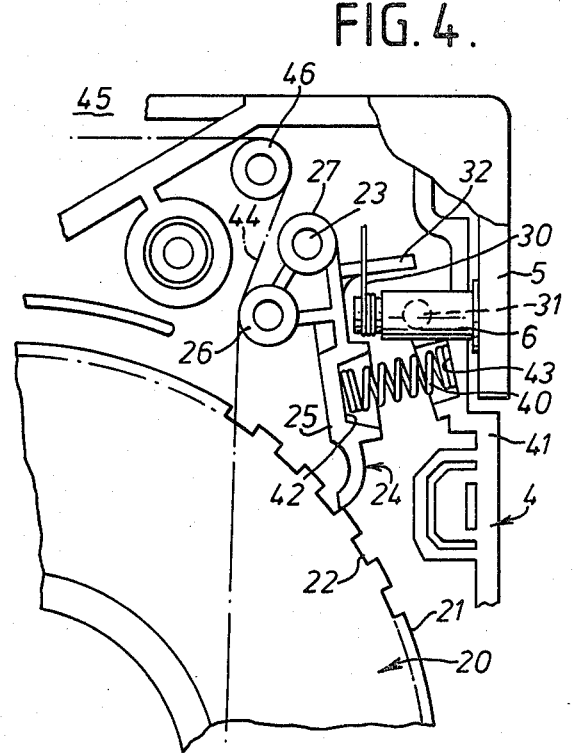
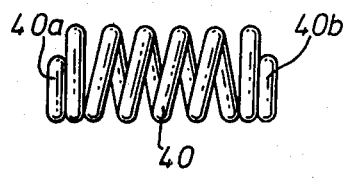
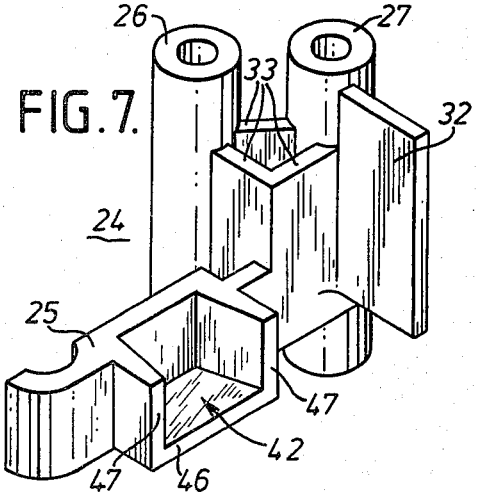

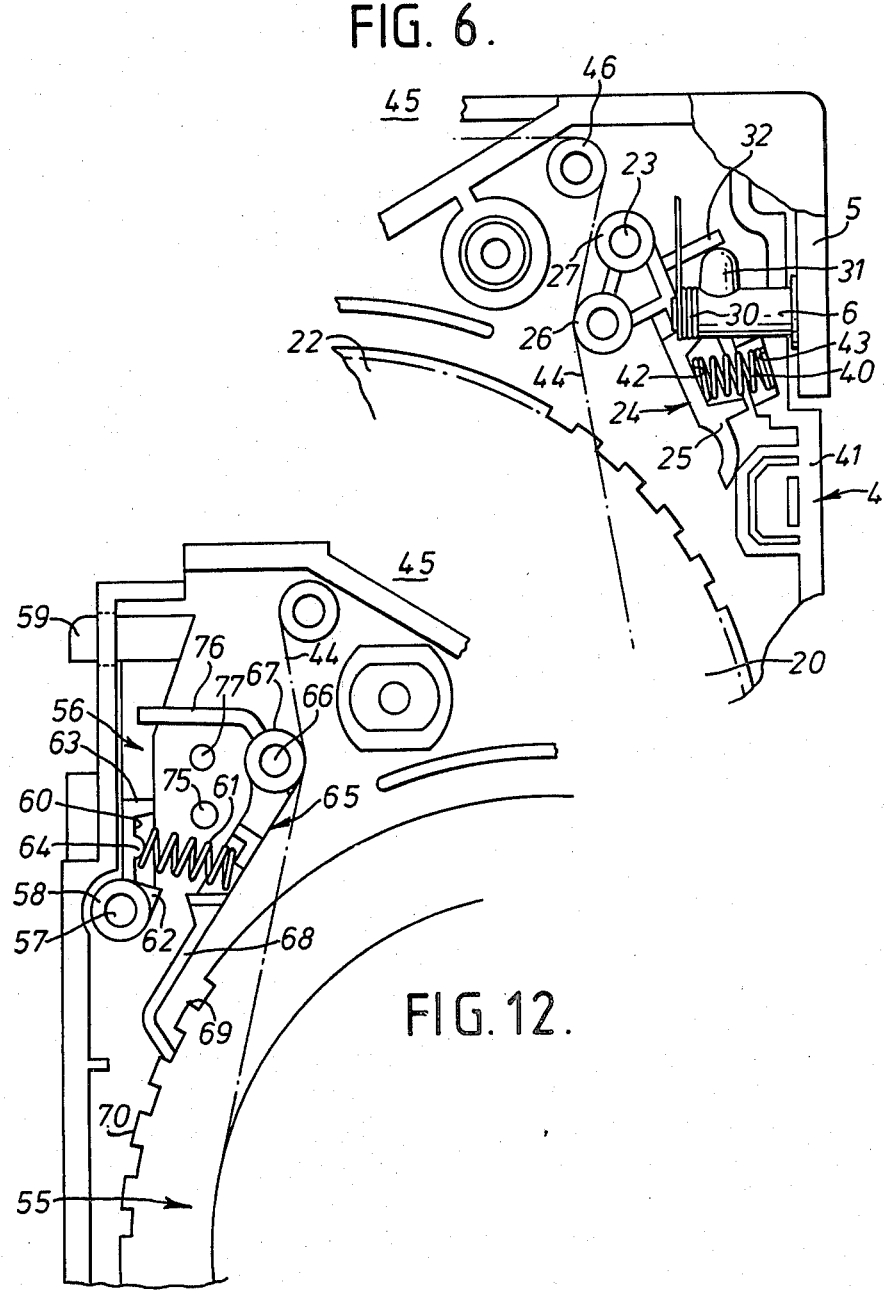

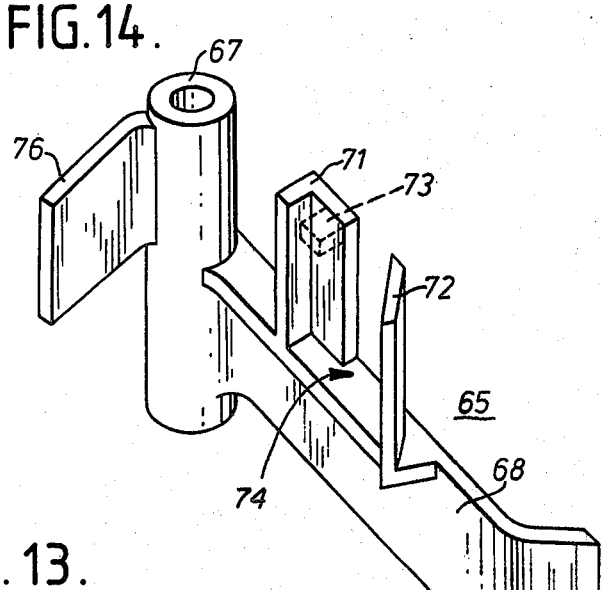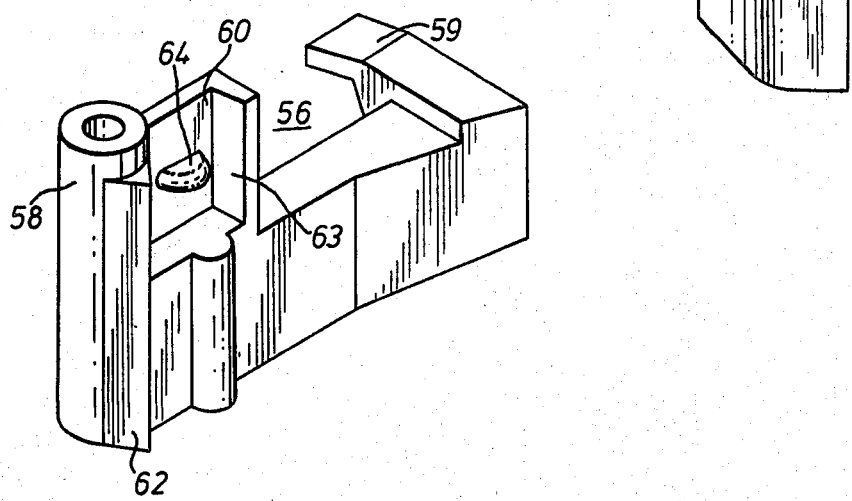

TAPE CASSETTE

BACKGROUND OF THE INVENTION

1. Field of the Invention

The present invention relates to a tape cassette, and more particularly, but not exclusively, relates to a tape cassette for a magnetic video tape recording and/or reproducing apparatus (VTR).

2. Description of the Prior Art

A conventional tape cassette for a VTR is, as disclosed, for example, in U.S. Pat. No. 3,900,172, provided with a pair of brake levers which engage with respective tape reels to prevent the latter from rotation when the tape cassette is not in use. The brake levers are arranged beside tape guide members which are positioned on respective sides of a front opening of the tape cassette, and as the magnetic tape is withdrawn from the front opening, the brake levers are released. This conventional tape cassette requires many parts and hence it is rather troublesome to assemble particularly in mass-production by automatic machinery. It has therefore recently been proposed to form each brake lever and an associated tape guide member as a unitary body. This unitary body is pivotally mounted in the tape cassette and is urged to rotate to bring the brake lever into engagement with teeth on a flange of the associated reel by a butterfly-type torsion spring, that is to say, by a spring having two tangentially extending arms which engage respectively with a surface of the unitary body and of a pin fixed to the cassette casing. Such springs are, however, very troublesome in mass-production techniques because when placed in bulk in a feed hopper they become entangled with one another and hence are difficult to separate and to feed to the point where they are assembled into the tape cassette.

SUMMARY OF THE INVENTION

One object of the present invention is to provide a tape cassette in which difficulties of mass-production resulting from the use of butterfly-type torsion springs is avoided.

Another object of the present invention is to provide a tape cassette which is more readily assembled.

According to an aspect of the present invention there is provided a tape cassette including a cassette casing, at least one tape reel disposed inside said cassette casing, a tape wound on said tape reel, an opening formed on said cassette casing, at least one tape guide member arranged on each side of said opening for guiding said tape along a tape path which is connected to said tape reel and which extends along said opening, a brake member engageable with said tape reel to prevent said tape reel from rotation when said tape cassette is not in use, and a helical compression spring acting on said brake member so as normally to urge said brake member into engagement with said tape reel.

Preferably at least one of said tape guide members and said brake member are formed as a unitary pivotally-mounted body, and said spring normally urges said body to a first position where said brake member engages with said tape reel and said tape guide member is so positioned that the tape path is shortened and hence the tape is tightly stretched across said opening.

The tape cassette will normally be provided with a lid which, in the closed position, closes said opening and protects said tape, and movement of said lid to the open position may simultaneously move said body against the action of said spring to a second position in which said brake member is disengaged from said reel.

The above, and other objects, features and advantages of this invention, will be apparent from the following detailed description of illustrative embodiments which is to be read in connection with the accompanying drawings.

BRIEF DESCRIPTION OF THE DRAWINGS

FIG. 4 shows part of the interior of an embodiment of a tape cassette according to the invention;

FIG. 5 shows a spring from the cassette of FIG. 4;

FIG. 6 is similar to FIG. 4 but shows a different condition;

FIG. 7 shows a perspective view of a brake lever body from the cassette of FIG. 4;

FIG. 12 shows another part of the interior of the cassette of FIG. 4;

FIG. 13 shows a perspective view of a lock lever from the cassette of FIG. 4;

FIG. 14 shows a perspective view of another brake lever body from the cassette of FIG. 4.

DESCRIPTION OF THE PREFERRED EMBODIMENTS

Before proceeding with a detailed description of embodiments of the invention, an example of a previously-proposed tape cassette will be described.

Figure 1:
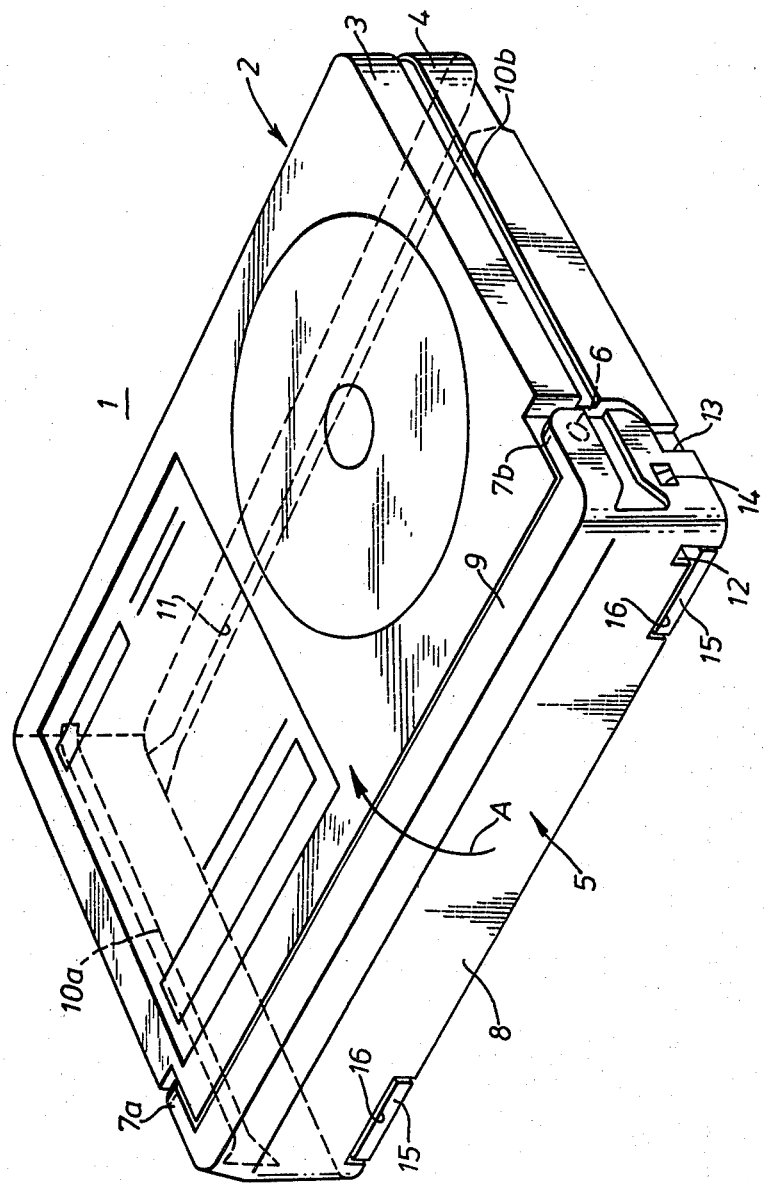
FIG. 1 shows a perspective view of a tape cassette.

As shown in FIG. 1, a tape cassette 1 used in a VTR has a flat rectangular parallelepiped shape, and includes a cassette casing 2 which comprises an upper half section 3 and a lower half section 4, both moulded of strong synthetic resin, for example, A.B.S. resin. In the casing 2, a supply reel and a take-up reel (not shown) are arranged for winding a magnetic tape (not shown) thereon. The cassette 1 further includes a lid 5 which is also moulded of synthetic resin and which includes a pair of ears 7a and 7b directed rearward from the opposite ends of a front portion 8. Pins 6 are formed integrally with the ears 7a and 7b, respectively, at the inside of the lid 5, and the pins 6 are rotatably supported in apertures in the side wall of the casing 2, whereby the lid 5 is rotatably supported by the casing 2. The front portion 8 of the lid 5 depends from the edge of the elongated top portion 9, and the lid 5 is resiliently urged to rotate so as to close the front opening of the casing 2.

Guide grooves 10a and 10b are formed in the outer surfaces of the relatively short side walls of the casing 2 and extend into the adjacent ears 7a and 7b of the lid 5 when the lid 5 is in the closed position. The undersurface of the bottom wall of the casing 2 is formed with a guide groove 11 extending parallel to the long open side of the casing 2. These guide grooves 10a, 10b and 11 constitute guide means to guide the cassette 1 during insertion into a cassette holder of a cassette loading mechanism of a VTR.

The lid 5 is opened by a lid opening means of the VTR which rotates the lid 5 in the direction shown by arrow a in FIG. 1, when the cassette 1 is inserted into the cassette holder of the VTR, whereby the magnetic tape extending along the front opening of the cassette 1 is exposed. The lid 5, which is urged in the closed direction, is locked by a lock lever arranged inside the casing 2 to prevent inadvertent opening of the lid 5 when the cassette 1 is not in use. The lock lever is arranged at the right corner of the front side of the casing 2. Corresponding to the lock lever, a pair of cut-out portions 12 and 13 are formed on the front surface and side surface of the casing 2, respectively, to receive a lock releasing member. The lock releasing member is led into the cut-out portions 12 and 13 to displace the lock lever into the inactive position, whereby the lid 5 is free to be opened. A rectangular opening 14 is formed in the ear 7b of the lid 5, the opening 14 engaging with a lock portion of the lock lever. A pair of recesses 16 are formed at respective ends of the lower edge of the lid 5, and the recesses 16 receive respective projections 15 formed on the front side of the casing section 4 of the cassette 1.

Figure 2:
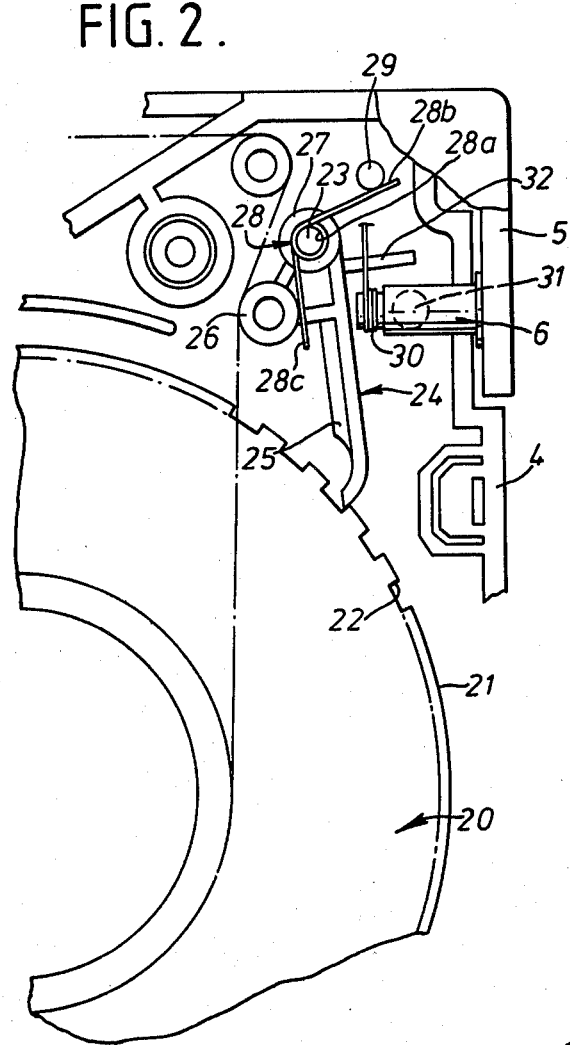
FIG. 2 shows part of the interior of the cassette of FIG. 1.
Figure 3:
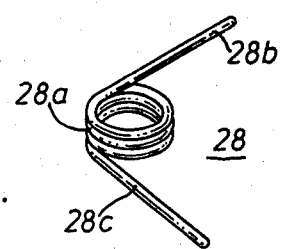
FIG. 3 shows a perspective view of a spring from the cassette of FIG. 1.

A part of the inner structure of the cassette 1 will now be described with reference to FIG. 2, which shows in particular the parts lying in the region between the take-up reel 20 and one end of the lid 5, the lid 5 being shown in the closed position. The take-up reel 20 has an upper flange (not shown) and a lower flange 21 on the outer periphery of which are formed teeth 22. Pivotally mounted on a pin 23 secured to the casing section 4 is an integral body 24 comprising a brake lever 25 and a cylindrical tape guide member 26. A sleeve portion 27 of the body 24 rotatably encircles the pin 23. Also encircling the pin 23 is a butterfly-type torsion spring 28 which is also shown in FIG. 3. The spring 28 comprises a ring part 28a and tangentially extending arms 28b and 28c. The ring part 28a encircles the pin 23, while the arm 28c bears against a further pin 29 secured to the casing section 4 and the arm 28b bears against a surface 45 of the tape guide member 26. The action of the spring 28 is therefore normally to urge the body 24 to rotate in the clockwise direction as viewed in FIG. 2, with the result that the hooked free end of the brake lever 25 engages with the teeth 22 to prevent rotation of the take-up reel 20.

Mounted on the inner end of the pin 6 is a torsion spring 30 which urges the lid 5 towards the closed position. Mounted on the side of the pin 6 is an actuating projection 31 which, as the lid 5 is moved from the closed to the open position on loading of the cassette 1 into the VTR with consequent rotation of the pin 6, engages with a tongue 32 projecting from the body 24, so causing the body 24 to rotate counter-clockwise as viewed in FIG. 2 about the pin 23 against the action of the spring 28. In consequence the brake lever 25 is disengaged from the teeth 22 and the take-up reel 20 is then free to rotate.

Such tape cassettes are generally mass-produced by automatic machinery and in such manufacture the spring 28 is found to be very troublesome. Thus where a large number of such springs are placed in a supply hopper they tend to become very much entangled with one another, which makes separation and trouble-free feeding to the assembly point difficult to accomplish.

An embodiment of the invention will now be described with reference to FIG. 4 which shows a view similar to that of FIG. 3 and which, where appropriate, uses the same reference numerals. The significant differences are that the butterfly-type torsion spring 28 of the FIG. 3 structure is replaced by a helical compression spring 40, and the body 24 and the side wall 41 of the casing section 4 are provided with recesses 42 and 43 respectively to receive the respective ends of the spring 40. In the position shown, that is with the lid 5 closed, the spring 40 urges the brake lever 25 into engagement with the teeth 22, so preventing rotation of the take-up reel 20. It will also be seen that as the body 24 rotates clockwise as viewed in FIG. 4 under the action of the spring 40, the tape guide member 26 moves to the left and in so doing intercepts the tape 44 and lengthens the tape path between the supply reel (not shown) and the take-up reel 20. As both the supply reel and the take-up reel 20 are locked against rotation at this time, this lengthening of the tape path has the effect of stretching the tape 44 tightly across the cassette front opening 45 between a tape guide 46 and a corresponding tape guide (not shown) adjacent to the other end of the front opening 45. This means that the risk of damage to the tape 44 when the cassette 1 is not in use is minimized, and moreover when the cassette 1 is loaded into the VTR and a finger (not shown) forming part of a tape loading mechanism of the VTR enters the cassette 1 for the purpose of drawing out a loop of the tape 44 to pass it round a guide drum, the finger is reliably disposed on the rearward side of the tape 44 and so draws out the required loop without fail.

FIG. 6 shows the structure of FIG. 4 when the lid 5 is open. The operation is basically the same as described with reference to FIG. 2 in that as the pin 6 rotates with the lid 5 the projection 31 engages with the actuating tongue 32 so forcing the body 24 to rotate counter-clockwise as viewed in FIG. 6, compressing the spring 40 and disengaging the brake lever 25 from the teeth 22. The take-up reel 20 is then free to rotate. In this condition the tape 44 may contact the sleeve portion 27 which has a smooth cylindrical external surface so that it can act as a tape guide member if necessary.

In mass-production of such tape cassettes, the spring 40 is readily handled because such springs can more easily be separated from one another in a supply hopper and are of a suitable shape for feeding down a cylindrical tube to an assembly point. The separability of such springs 40 is much improved if the ends are closed, that is to say, if, as shown in FIG. 5, the end turns 40a and 40b of the helix are closed in the axial direction so as not to leave a free end which might catch on or in an adjacent spring 40.

FIG. 7 shows the body of FIG. 4 in greater detail. The body 24 comprises the brake lever 25, the tape guide member 26, the sleeve portion 27 and the tongue 32, with support and connecting positions 33. The recess 42 for receiving and locating an end of the spring 40 (not shown) is defined by a bottom wall 46 and side walls 47.

Figure 8:
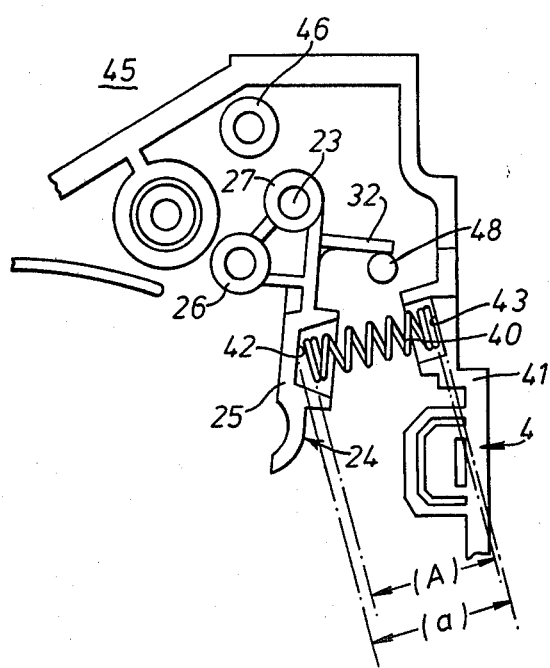
FIG. 8 shows a step in the manufacture of the cassette of FIG. 4.

FIG. 8 shows a stage in manufacture of the cassette 1. At this stage the take-up reel 20 has not yet been inserted and the body 24 is rotated clockwise to a position which is defined and limited by the engagement of the tongue 32 with a pin 48 secured to the cassette section 4. In this position of the body 24 the distance a between the recesses 42 and 43 is a little greater than the axial length A of the spring 40, so that the spring 40 can readily be inserted by automatic machinery. The body 24 is then rotated counter-clockwise as viewed in FIG. 8 sufficiently to enable the take-up reel 20 (not shown) to be inserted, such rotation somewhat compressing the spring 40.

Figure 9:
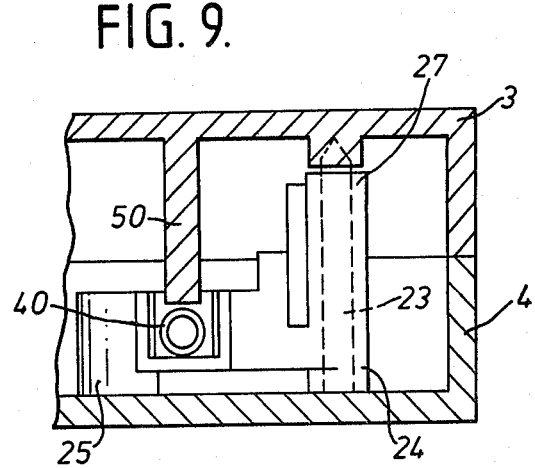
FIG. 9 shows a detailed cross-section of part of the cassette of FIG. 4.
Figure 11:
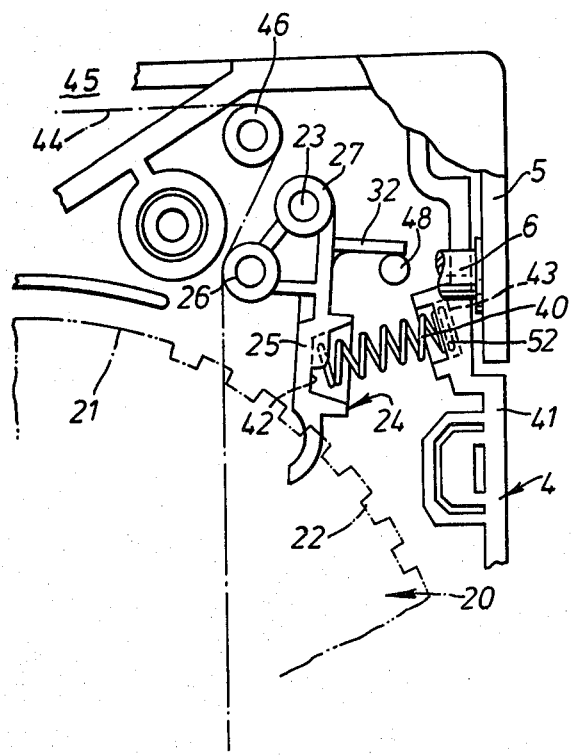
FIG. 11 shows part of the interior of the cassette of FIG. 4 when using the modified brake lever body of FIG. 10.
Figure 10:
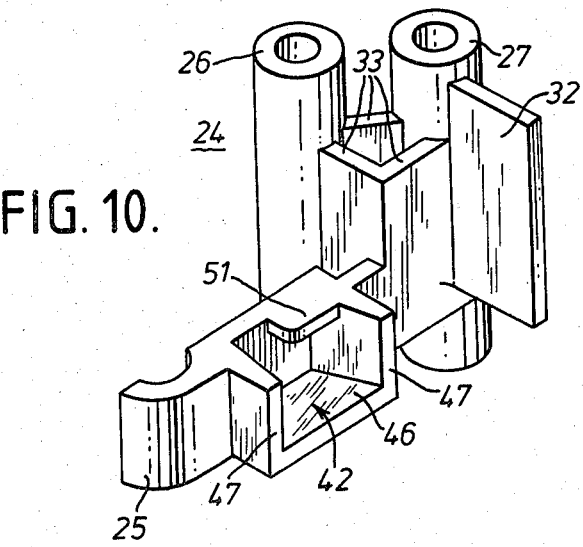
FIG. 10 shows a perspective view of a modified brake lever body from the cassette of FIG. 4.

It is desirable to provide some means of retaining the spring 40 once inserted, and some possibilities are shown in FIGS. 9 to 11. In FIG. 9 a stop post 50 depends from the cassette section 3 and is so positioned that when during manufacture the cassette sections 3 and 4 are secured together, the free end of the stop post 50 is adjacent to the central region of the spring 40 and thus inhibits displacement of the spring 40 other than by axial compression and expansion. In FIG. 10, the recess 42 of the body 24 is additionally provided with a partial top wall 51 to inhibit radial displacement of the end of the spring 40 from the recess 42. In FIG. 11 the body 24 of FIG. 10 is shown and in addition the recess 43 in the side wall 41 has a top wall 52 to inhibit radial displacement of the other end of the spring 40 from the recess 42.

Reference will now be made to FIG. 12, which shows in particular the parts lying in the region between the supply reel 55 and the other end of the lid 5, the lid 5 not being shown, but being assumed to be in the closed position. The differences between the structure of FIG. 12 and the structure previously described, for example the structure of FIG. 4, arise because of the presence of the lock member 56 which is more clearly seen in FIG. 13. The lock member 56 is pivotally-mounted on a pin 57 which is encircled by a sleeve portion 58 at one end of the lock member 56. At the other end of the lock member 56 is a projection 59 which cooperates with the opening 14 (FIG. 1) in the lid 5. The lock member 56 further provides a recess 60 to receive one end of a helical compression spring 61, the recess 60 being defined by a projection 62 on the sleeve portion 58 and a side wall 63. A boss or pip 64 may also be provided to assist location of one end of the spring 61.

A body 65 corresponding generally in function to the body 24 shown, for example, in FIG. 4, is more clearly seen in FIG. 14. The body 65 is pivotally-mounted on a pin 66 which is encircled by a sleeve portion 67 of the body 65. Projecting from the sleeve portion 67 is a brake lever 68, the hooked free end of which can engage with teeth 69 on the lower flange 70 of the supply reel 55. The brake lever 68 also carries side walls 71 and 72 to define a recess 74 to receive the other end of the spring 61. The recess 74 may have a partial top wall 73 as indicated in broken lines to inhibit radial displacement of the end of the spring 61. A pin 75 secured to the casing section 4 may also be provided to inhibit radial displacement of the central part of the spring 61. Also projecting from the sleeve portion 67 is a tongue 76 which is displaced in a similar manner to that of the tongue 32 and described with reference to FIG. 6 when the lid 5 is opened, so rotating the body 65 clockwise as viewed in FIG. 12 and disengaging the brake lever 68 from the teeth 69 to permit the supply reel 55 to rotate. The tongue 76 also cooperates with a pin 77 during manufacture to define the position occupied by the body 65 when the spring 61 is to be inserted.

Although the embodiment described above has brake levers disposed adjacent to respective sides of the front opening of the tape cassette, the invention can also be applied to a tape cassette in which the brake levers are disposed at the rear of the tape cassette between the two reels. An embodiment having this arrangement will now be briefly described with reference to FIG. 15.

Figure 15:
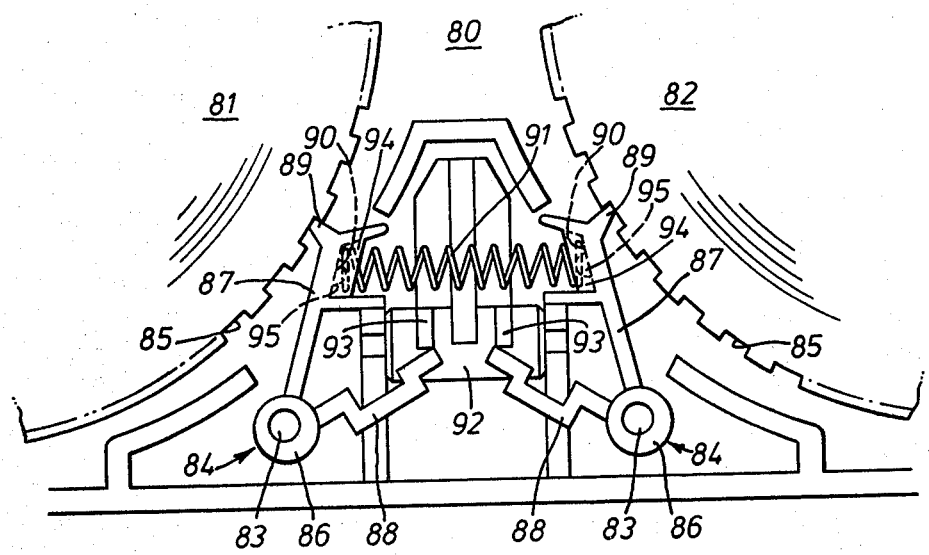
FIG. 15 shows part of the interior of another embodiment of a tape cassette according to the invention.

The tape cassette 80 has supply and take-up reels 81 and 82, and pivotally mounted on respective pins 83 between the reels 81 and 82 are similar brake levers 84 cooperating, respectively with teeth 85 in the bottom flanges of the reels 81 and 82. Each brake lever 84 comprises a sleeve portion 86 which encircles the associated pin 83 and from which project arms 87 and 88. The outside ends of the arms 87 carry projections 89 to engage with the teeth 85 and the inside ends define recesses 90 to locate the opposite ends of a single helical spring 91 which normally urges the projections 89 into engagement with the teeth 85. The arms 88 cooperate with a member 92 carrying projections 93 which, when the reels 81 and 82 are to be released, move the free ends of the arms 88 downwards as viewed in FIG. 15 so compressing the spring 91 and freeing the reels 81 and 82. As indicated in FIG. 15, the recesses 90 may have top walls 94 and bosses or pips 95 to assist location of the ends of the spring 91. For the reasons given above in the discussion of spring 40, the ends of the spring 91 are preferably closed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A tape cassette comprising a cassette casing; at least one reel which, upon assembly of the cassette, is disposed inside said cassette casing, and upon which a tape is wound, said reel having a flange with a toothed marginal portion at a predetermined radial distance from the axis of said reel; a respective brake member associated with said at least one reel and pivotally mounted in said cassette, said brake member having a brake lever engageable with said toothed marginal portion for preventing said tape reel from rotating; means for urging said brake lever away from said toothed marginal portion to permit rotation of said reel; a helical compression spring having a predetermined uncompressed axial length; and retaining means for said spring including means defining a first seat for one end of said spring on said brake member and means within said casing defining a second seat for the other end of said spring at a distance from said first seat, said distance between the first and second seats being less than said uncompressed axial length of the spring when said brake lever engages said toothed marginal portion of the reel flange so that said spring engaging, at its opposite ends, with said first and second seats is axially compressed to normally urge said brake lever against said toothed marginal portion, said brake lever being free to swing closer to said axis of the reel than said predetermined radial distance when said reel is absent from said casing so as to increase said distance between the first and second seats beyond said uncompressed axial length of said spring for facilitating the entry of said spring between said seats.

2. A tape cassette according to claim 1, in which there is an opening in said cassette casing, and further comprising at least one tape guide member arranged on each side of said opening for guiding said tape in a tape path which extends from said reel and along said opening.

3. A tape cassette according to claim 1, further comprising stopping means depending from the interior of said cassette casing for preventing displacement of said spring other than by axial compression and expansion.

4. A tape cassette according to claim 1, further comprising means associated with said retaining means for preventing removal of the ends of said spring from said seats.

5. A tape cassette according to claim 1, wherein said brake member is formed as a unitary body having a sleeve portion overfitting a pivot projection in said cassette casing for permitting pivotal motion of said brake lever, and a tongue extending substantially radially in respect to said sleeve for interacting with said means for urging said brake lever away from said toothed marginal portion.

6. A tape cassette according to claim 1, wherein said cassette casing has a wall and said, brake member and said wall have respective recesses formed in their surfaces to define said first and second seats, so that the ends of said spring are respectively received in said recess formed in said brake member and in said recess formed in said wall of said tape cassette.

7. A tape cassette according to claim 1 wherein the ends of said spring are closed.

8. A tape cassette according to claim 1, in which there are a pair of said tape reels disposed inside said casing, and each having associated therewith a respective said brake member engageable with the respective tape reel, and a respective said helical spring acting on each said brake member normally to urge each said brake member into engagement with the respective one of said tape reels.

9. A tape cassette according to claim 1, in which there are a pair of said tape reels disposed inside said casing, and each having a respective said brake member engageable with each said tape reel, and a single said helical spring acts on both brake members normally to urge each said brake member into engagement with the respective one of said tape reels.

10. A tape cassette according to claim 2; wherein said at least one tape guide member and said brake member are formed as a unitary body.

11. A tape cassette according to claim 10; wherein said body, in addition to said brake lever, a cylindrical portion which functions as said tape guide member.

12. A tape cassette according to claim 11, further comprising a lid which is mounted on said cassette so that it can be opened to expose the tape at that portion of said tape path which extends along said opening, and an actuating member which is mounted to move when said lid is opened; and wherein said body further comprises a contacting portion positioned to be pushed by said actuating member when said lid is opened so as to pivot said body and disengage said brake member from said tape reel.

13. A tape cassette, including a cassette casing; at least one tape reel disposed inside said cassette casing, and having teeth formed on a marginal portion of a reel flange thereof; a tape wound on said tape reel; an opening formed in said cassette casing; at least one tape guide member arranged on each side of said opening for guiding said tape in a tape path which extends from said tape reel and along said opening; a brake member engageable with said tape reel to prevent said tape reel from rotating when said tape cassette is not in use, said brake member and at least one of said tape guide members being formed as a unitary body pivotally mounted in said cassette casing with a cylindrical portion thereof functioning as said tape guide member and a brake lever thereof functioning as said brake member, said brake lever having a portion engageable with said teeth to prevent said tape reel from rotating, said unitary body also being formed with a contacting portion, said tape guide member being spaced from the pivotal axis of said body so that the length of said tape path is altered in accordance with the rotational displacement of said body; a lid mounted on said cassette so that it can be opened to expose the tape at that portion of said tape path which extends along said opening; an actuating member which is mounted to move when said lid is opened, wherein said contacting portion is positioned to be pushed by said actuating member when said lid is opened so as to pivot said body and disengage said brake member from said tape reel, and rotationally displace said body in the sense to shorten said tape path when said lid is opened; and a helical compression spring acting against said body to normally urge the latter to pivot in the direction for engaging said brake member with said tape reel.

14. A tape cassette including a cassette casing; at least one tape reel disposed inside said cassette casing; a tape wound on said tape reel; an opening formed in said cassette casing; at least one tape guide member arranged on each side of said opening for guiding said tape in a path which extends from said tape reel and along said opening; a lid mounted on said cassette so that it can be opened to expose the tape at that portion of said tape path which extends along said opening; a locking member for preventing said lid from opening when said locking member is in a locking position; a brake member engageable with said tape reel to prevent said tape reel from rotating when said tape cassette is not in use, said brake member and said locking member each having a recess formed in one of their surfaces; and a helical compression spring acting on said brake member so as normally to urge said brake member into engagement with said tape reel, wherein the ends of said spring are respectively received in said recess formed in said brake member and in said recess formed in said locking member.

15. A method of assembling a tape cassette comprised of a cassette casing; at least one reel upon which a tape is wound; a brake member to be associated with said at least one reel and pivotally mounted in said cassette and which includes a brake lever engageable with teeth formed on a marginal portion of a reel flange of said reel, said marginal portion being a predetermined radial distance from the axis of said reel, means for urging the brake lever away from said teeth to permit rotation of said reel; a helical compression spring of a predetermined uncompressed axial length; and means defining first and second seats on said brake member and within said cassette casing, respectively, for retaining the opposite ends of said spring, and which define a distance between said seats, when said brake member engages said teeth, which is less than said uncompressed axial length of said spring; the method of assembly comprising the steps of:

pivoting, prior to insertion of said reel, said brake member so that the brake lever swings toward said axis beyond said radial distance and said distance between said seats exceeds said uncompressed axial length;

inserting said spring between said seats for retaining said spring;

pivoting said brake member in the sense to axially compress said spring and swing said brake lever outside said radial distance from said axis of the reel;

inserting said reel; and releasing said brake member so that said spring can urge said brake lever to engage said teeth.

* * * * *